Dec. 6, 1927. 1,651,642
W. R. STANFIELD
SUPPORTING AND DRIVING MECHANISM FOR DEVICE AT SIDE OF TRACTORS
Filed May 11, 1925 2 Sheets-Sheet 2
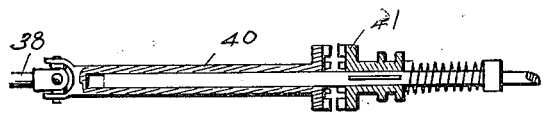
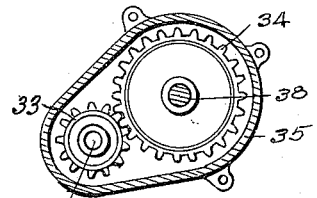
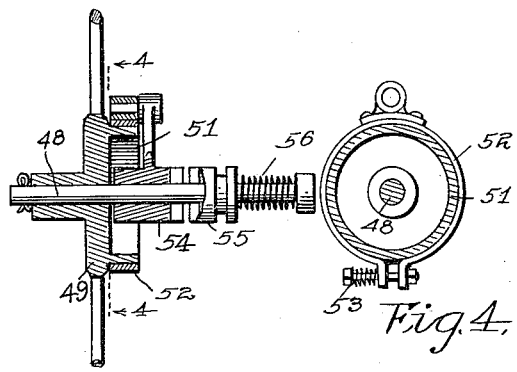
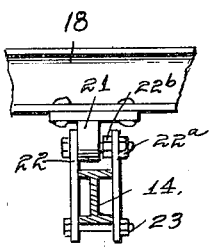
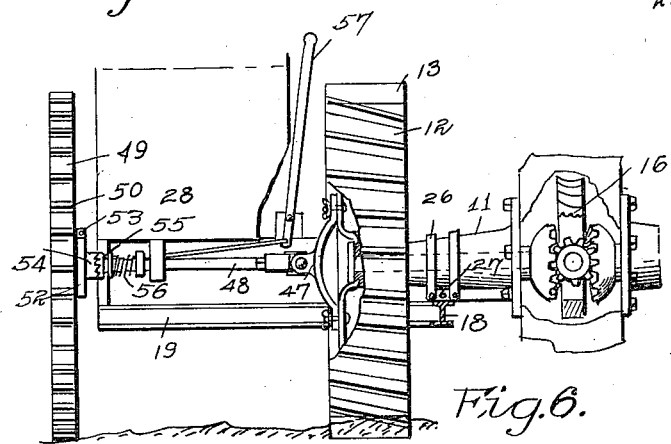
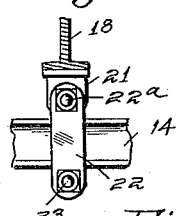
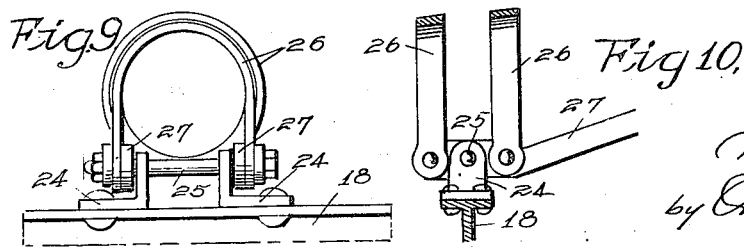
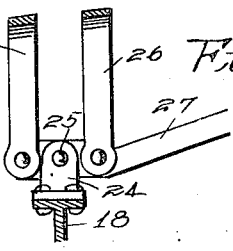

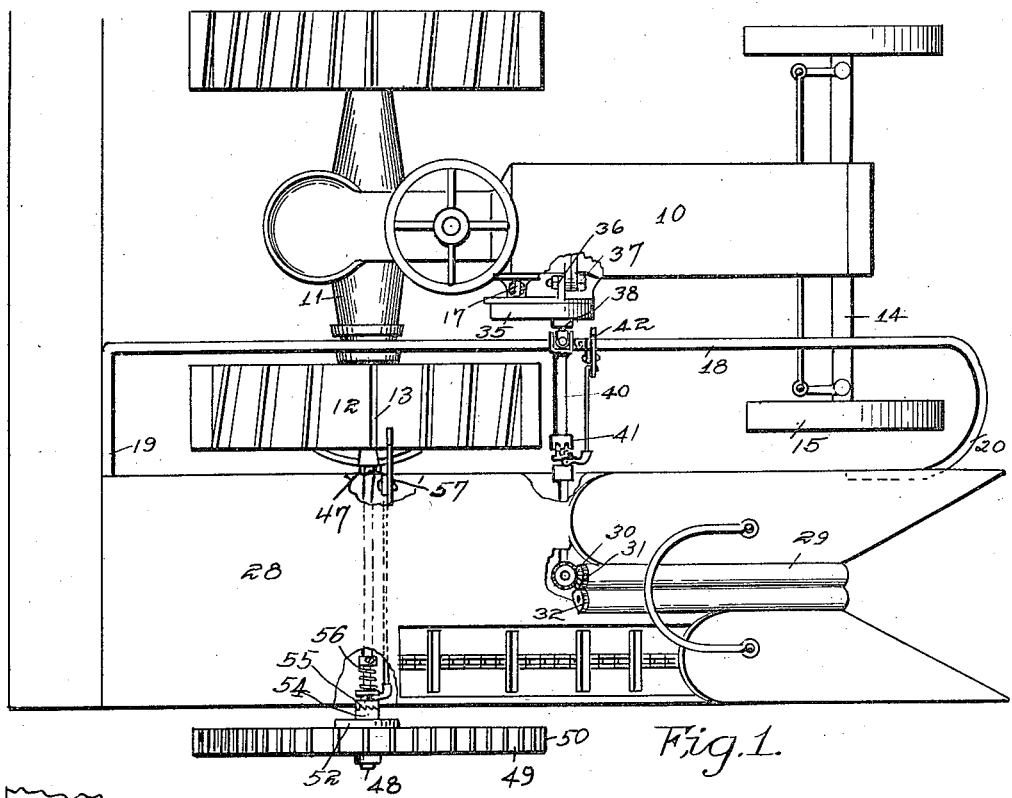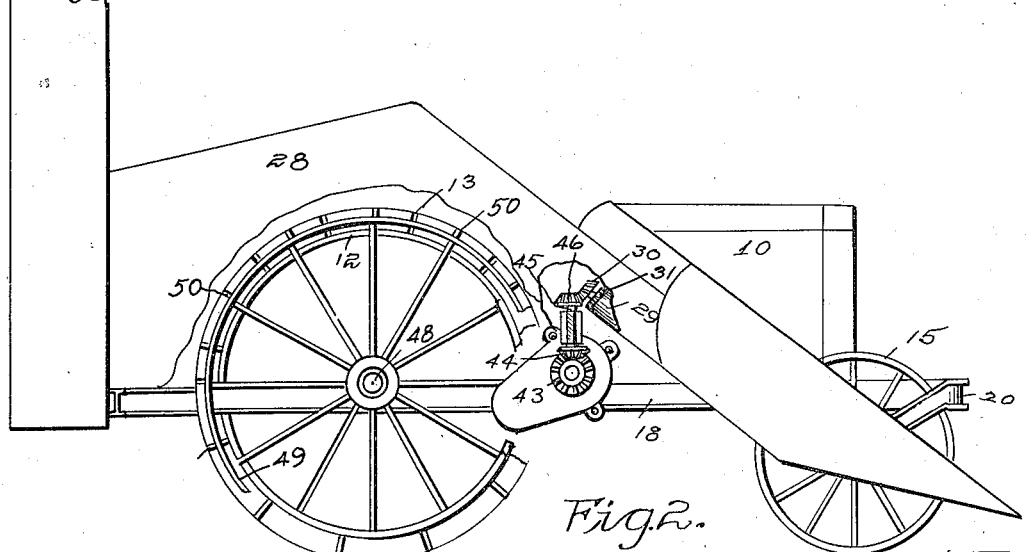

Patented Dec. 6, 1927.

1,651,642

UNITED STATES PATENT OFFICE.

WILLIAM R. STANFIELD, OF UNION, IOWA.

SUPPORTING AND DRIVING MECHANISM FOR DEVICE AT SIDE OF TRACTORS.

Application filed May 11, 1925. Serial No. 29,458.

In connection with certain kinds of implements, such for instance as corn snappers and huskers, they have until recent years been advanced across the field by draft animals, and the power for operating the working parts thereof has been derived from the traction wheels. In using such devices in connection with tractors, such for instance as Fordson tractors, it is not desirable to attach the implement in front of the tractor, because of the difficulties in turning at the end of the row and for other reasons, and it is also objectionable to attach such implement to the side of the tractor for the reason that the side draft occasioned by the advance of the implement over the field interferes to a considerable extent with the steering and turning of the tractor.

The objects of my invention are to provide means of simple, durable and inexpensive construction, whereby an implement, such for instance as a corn harvester, may be located at the side of a Fordson, or other tractor, and be advanced by power from the tractor wheels, and its mechanism driven by power from the tractor engine, and whereby the operating mechanism may be driven at different speeds relative to the speed of advance, or may be driven when the tractor is stationary.

More particularly, however it is my object to provide an attachment of this character whereby the side draft, normally occasioned by the operation of an implement such as a corn harvester at the side of the tractor, is eliminated to such an extent at least that it will not interfere with the easy and convenient steering of the tractor, nor with the turning of the tractor in either direction at the end of the row, nor when backing.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a Fordson tractor and a corn harvester arranged at the side thereof with my improved supporting and driving device applied thereto.

Figure 2 shows a side elevation of same with parts broken away showing structural details.

Figure 3 shows an enlarged, detail, sectional view illustrating a portion of the extension axle for the corn harvester, and illustrating the ratchet and clutch device applied thereto.

Figure 4 shows a sectional view of same on the line 4—4 of Figure 3.

Figure 5 shows an enlarged detail view illustrating the gearing device between the pulley axle of the Fordson tractor and the power shaft for the harvester.

Figure 6 shows a detail elevation taken from the front and illustrating a portion of the Fordson tractor axle and differential gear, and one of the Fordson tractor wheels and my improved extension axle and outer supporting wheel with parts broken away to illustrate structural details.

Figure 7 illustrates a detail view illustrating the manner in which the supporting frame is attached to the front axle of the Fordson tractor.

Figure 8 is a side elevation of same.

Figure 9 shows an enlarged detail view, partly in section, of a portion of the Fordson rear axle housing and a portion of the supporting frame of my improved attachment, and illustrating the means for detachably connecting same.

Figure 10 shows a front elevation of same; and

Figure 11 shows an enlarged detail view illustrating the sliding clutch device for the corn harvester drive shaft.

Referring to the accompanying drawings, I have used the reference numerals 10 to indicate generally the Fordson tractor, 11 indicates the housing for the rear axle and differential gear, 12 the rear traction wheels both of which are provided with road engaging lugs 13 of the ordinary kind, 14 indicates the front axle, 15 the steering wheels thereon, 16 indicates generally the differential gear in the rear axle housing, and the power shaft for the engine to which a pulley is usually applied is indicated by the numeral 17.

In applying my improvements to a Fordson tractor, no change whatever is made in the tractor proper. It is to be understood that the tractor is an ordinary Fordson, or that any other farm tractor may be utilized in place thereof.

My improved attachment comprises a frame, which frame is formed primarily of a single structural metal member 18 with its rear end bent laterally at 19, and its forward end curved forwardly and outwardly and rearwardly at 20 around the adjacent steering wheel, and so arranged as it does not in any way interfere with the movements of the steering wheel. For connecting this frame member 18 to the front axle 14, I have provided a lug 21 riveted to the member 18, and two plates 22 connected by a bolt 22ª bolted to the lug 21 and extended downwardly on opposite sides of the axle 14, as shown in Figure 7. This bolt is provided with a nut 22ᵇ designed to engage the inner surface of one of the plates 22 so that the plates 22 may be firmly clamped together by the bolt 22ª, and at the same time the bolt will be given pivotal movement within the lug 21. These plates 22 are connected at their lower ends by a bolt 23 and clamped to the front axle by said bolts, thus making a device which is readily and easily detached from the axle, and yet pivotally connected therewith when in use.

For supporting the rear of the member 18, I have provided two lugs 24 riveted to the member 18 and provided with a bolt 25 extended through them, and connected to these two lugs 24 are two metal straps 26 which are shaped to pass over and around the rear axle housing member 11 at a point between the adjacent tractor wheel and the differential gear, as clearly shown in Figure 6. For supporting these metal straps 26 in proper position on said rear axle housing, I have provided braces 27 fixed at one end to the bolt 25, and bolted at the other end to the differential housing, as shown in Figure 6, thus providing a firm support for the member 18 at its rear end, and yet permit said member 18 to swing upon the bolt 25.

The corn snapper and husker device is of itself of the ordinary form now in common use, and comprises a body portion indicated generally by the numeral 28, supported at its front end on the member 20 and at its rear end upon the lateral extension 19 of the beam 18. It comprises a pair of snapping rolls 29, one of which has a bevel gear 30 thereon by which it may be driven, and they are driven in unison by the coacting gears 31 and 32 in the ordinary manner.

For imparting motion to the snapping rolls or to the mechanism to be attached to the side of a tractor, I have provided the following: Instead of the pulley ordinarily provided on the drive shaft 17, I have provided a small pinion 33 in mesh with a larger pinion 34 contained within a gear case 35, which gear case is detachably bolted to and supported by a part of the tractor engine frame, as shown by the lug 36 and the bolt 37 in Figure 1. The large pinion 34 is connected to a shaft 38 which extends outwardly laterally from the gear case and is provided at 39 with an ordinary universal joint. This shaft is also provided, as illustrated in Figure 11, with a telescopically sliding sleeve connection 40, and a spring actuated clutch member 41 controlled by a lever 42 arranged accessible to the driver's seat. On the outer end of said shaft is a bevel pinion 43 connected with a bevel pinion 44 on the shaft 45, and on this latter shaft is the bevel pinion 46 which meshes with the bevel pinion 30, as shown in Figure 2, and whereby the snapping rolls are positively driven by power from the Fordson tractor engine as distinguished from the traction wheels thereof.

I have demonstrated by experiment that if a heavy device, such for instance as a corn picker and husker, is provided with an ordinary supporting wheel only, and is advanced alongside of a tractor, it is at all times difficult, and sometimes impossible to steer the tractor in a straight line as required for following up a row of corn stalks, and at the same time much power of the tractor is lost in overcoming side draft. For overcoming these difficulties, I have provided the following mechanism:

Detachably fixed to the rear right tractor wheel in line with the axle is a universal joint 47 to which an axle 48 is connected. Rotatively mounted on the outer end of this axle is a traction wheel 49 having relatively thin traction lugs 50 on its periphery. In this connection it is to be noted that the diameter of the traction wheel 49 is greater than the diameter of the adjacent traction wheel 12 of the tractor to which it is attached. The outer surface of the ground engaging lugs 13 of the tractor wheel 12 are of substantially the same diameter as the outer edges of the ground engaging lugs 15 on the tractor wheel 49.

Formed on the inner face of the tractor wheel 49 surrounding the axle 48 is a drum 51, and an adjustable brake band 52 is supported adjacent to said drum, and provided with an ordinary spring actuated tension device 53. Mounted upon the axle 48 is a ratchet clutch device comprising a ratchet toothed member 54 rotatively mounted upon the shaft 48 and a coacting ratchet clutch member 55 slidably and non-rotatively mounted upon the shaft 48, the latter being normally held in engagement with the former by a spring 56. A lever 57 is connected in the ordinary manner with the sliding ratchet clutch member 55, whereby it may be held against the pressure of the spring 56 out of engagement with its coacting ratchet member.

In practical use, and assuming that the tractor and corn picker is being advanced in a field of corn, then it is obvious that on account of the universal joint in the axle 48 all three of the traction wheels 12, 12 and 49 will rest upon the ground surface, even though it should be irregular, and that each will advance under normal conditions at the speed of the drive axle of the tractor.

Under normal conditions, and assuming that the three alined traction wheels advance uniformly, then obviously there will be no side draft and the steering of the tractor is accomplished in the same manner and with the same ease as though the three tractor wheels and the corn picker were absent. Under actual working conditions, however, such ideal conditions do not frequently occur, and on account of the irregularity of the ground surface, and also on account of the fact that in some instances there will be more efficient tractive contact between the auxiliary tractor wheel and the ground, and in other instances less efficient tractive contact. Hence, under some circumstances the third or auxiliary tractor wheel will tend to lag behind the other two, and in other instances it will tend to advance faster than the two tractor wheels of the tractor, and this is particularly emphasized when turning the tractor around at the end of a row.

The construction and operation of the ratchet device 54, 55 and 56 is such that it always tends to rotate the tractor wheel 49 at the same speed as the driving shaft on which it is mounted, but under certain conditions, as for instance when the machine is turning toward the left, the wheel 49 may rotate somewhat faster than the driving axle.

In the event, however, that ground conditions should be such that there is a tendency for the third or auxiliary tractor wheel to lag behind the other tractor wheels, this tendency can only operate temporarily, because of the fact that the tractor wheel 49 is of larger diameter than the other tractor wheels. Hence, if such tendency for the tractor wheel 49 to lag behind is encountered, it will soon be overcome upon a change in ground conditions, and the tractor wheel 49 will again tend to advance faster than the other tractor wheels.

In this connection, I have found that in practice with my improved device there is, under almost all workable conditions, a constant tendency for the tractor wheel 49 to advance faster than the other tractor wheels, and thus tend to turn the tractor toward the left in advancing. However, when this tendency becomes great enough to be appreciable, or to actually swing the tractor toward the left, then the clutch device or the wheel 49 will slip and thereby permit the tractor wheel 49 to be temporarily retarded in its advance movement with relation to the tractor wheels 12.

In the event, however, that the row being cultivated curves toward the right, or that the operator is turning toward the right at the end of a row, then since the ratchet clutch cannot slip in the direction required for permitting the tractor wheel 49 to move slower than the tractor wheels 12, the band clutch device 51 and 52 is so adjusted that it will permit the wheel 49 to move relative to the axle 48 before any such strains are applied to the axle or wheel as might tend to injure it.

In this connection, however, and assuming that it is desired to turn toward the right, it is preferable that the operator grasp the lever 57 and wholly disengage the ratchet clutch device during such turning movement, but even if the operator should forget to do this, the clutch device will automatically operate and prevent injury to the axle 48.

My entire device may be readily, quickly and easily applied to a Fordson or other tractor without in any way injuring the action of the tractor. Furthermore, by means of the universal joint 47 and the pivotal connection of the frame member 18 with the front axle and the rear axle housing of the Fordson tractor, the traction wheel 49 is at all times permitted to rest upon the ground surface, regardless of any irregularity therein. This is also true in regard to the driving shaft which operates the corn snapping rolls.

Furthermore, it sometimes happens that corn is excessively heavy in spots and light in other spots. These conditions, however, can be readily met by the use of my improvement because where the corn is excessively heavy the tractor may be advanced slowly and the corn snapping mechanism can be operated rapidly, because the power for such operation of the corn snapping mechanism is taken from the engine proper and not from the driving axle. In some instances in use it has been found desirable to stop the advance of the tractor completely, and yet continue the operation of the corn snapping and husking mechanism.

It is important in connection with my invention that the third or auxiliary tractor wheel, under normal conditions, tends to advance slightly faster than the main tractor wheels, and in view thereof it is also important that some means be provided for permitting the third or auxiliary tractor wheel, under certain conditions, to slip ahead relative to the main tractor wheels in order to permit the machine to turn toward the right without slipping the auxiliary tractor wheel upon the ground. My preferred mechanism for accomplishing this desirable result is the ratchet device.

For convenience I have illustrated and described my improvement as applied to a corn harvester device. Obviously, however, my improvements may be utilized in connection with various other mechanisms, and I do not desire to be understood as limiting my claims to the use of my invention as applied solely to corn harvesting mechanisms.

I claim as my invention:

1. In a device of the class described, the combination of a tractor comprising an engine and two tractor wheels driven thereby, a third or auxiliary tractor wheel arranged at one side of the tractor and in line with the axis of the tractor wheels, means whereby power from the engine is applied to the third or auxiliary tractor wheel for advancing it, said tractor wheels being so constructed and arranged relative to each other that the third or auxiliary tractor wheel tends to advance over the ground surface slightly faster than the other tractor wheels, and means for automatically permitting the third or auxiliary tractor wheel to temporarily be retarded in its driving advance with relation to the other tractor wheels.

2. In a device of the class described, the combination of a tractor comprising an engine and two tractor wheels driven thereby, a third or auxiliary tractor wheel arranged at one side of the tractor and in line with the tractor axis, means whereby power from the engine is applied to the third or auxiliary tractor wheel for advancing it, said tractor wheels being so constructed and arranged relative to each other that the third or auxiliary tractor wheel tends to advance over the ground surface slightly faster than the other tractor wheels, and a ratchet device arranged in the means for driving the third or auxiliary tractor wheel and so constructed that when the third or auxiliary tractor wheel actually advances faster than the other tractor wheels, it will permit the third or auxiliary tractor wheel to rotate faster than its driving axle.

3. In a device of the class described, the combination of a tractor including an engine and two tractor wheels, of an auxiliary axle in line with the axle of the tractor wheels, and having a universal joint and operatively connected with the adjacent traction wheels to be rotated in unison therewith, a third or auxiliary traction wheel mounted on said auxiliary axle, means for driving it by power from said auxiliary axle, said tractor wheels being so constructed and arranged relative to each other that the third or auxiliary tractor wheel tends to advance over the ground surface slightly faster than the other tractor wheels, and means for automatically permitting the third or auxiliary tractor wheel to temporarily be retarded in its driving advance with relation to the other tractor wheels.

4. In a device of the class described, the combination of a tractor including an engine and two tractor wheels, of an auxiliary axle in line with the axle of the tractor wheels, and having a universal joint and operatively connected with the adjacent traction wheels to be rotated in unison therewith, a third or auxiliary traction wheel mounted on said auxiliary axle, means for driving it by power from said auxiliary axle, said tractor wheels being so constructed and arranged relative to each other that the third or auxiliary tractor wheel tends to advance over the ground surface slightly faster than the other tractor wheels, and a ratchet device arranged in the means for driving the third or auxiliary tractor wheel and so constructed that when the third or auxiliary tractor wheel actually advances faster than the other tractor wheels, it will permit the third or auxiliary tractor wheel to rotate faster than its driving axle.

5. In a device of the class described, the combination of a tractor, three supporting wheels spaced apart from each other and arranged with their axes in alinement, means for applying driving power from the tractor to all three of said wheels, a differential gear device between two of said traction wheels, and a universal joint between one of said traction wheels and the auxiliary traction wheel at the side thereof, the third or auxiliary traction wheel being so shaped and constructed that it normally tends to advance over the ground surface faster than the other two traction wheels, and means for permitting the third or auxiliary tractor wheel to automatically slip back relative to its driving axle when its tendency to advance exceeds a certain predetermined point.

6. In a device of the class described, the combination of a tractor having two driven tractor wheels, of an auxiliary axle secured to one of the tractor wheels at the side thereof in line with the axis of said tractor wheels, a universal joint in said auxiliary axle, a third or auxiliary drive wheel rotatively mounted on the outer end of the auxiliary axle, an adjustable friction clutch device between the auxiliary axle and the third driving wheel, a spring actuated ratchet device in the auxiliary axle, and means for manually releasing the ratchet device.

WILLIAM R. STANFIELD.